J. WUNDRACH.
SAUSAGE MACHINE.
APPLICATION FILED AUG. 22, 1908.
931,363.
Patented Aug. 17, 1909.
2 SHEETS—SHEET 1.
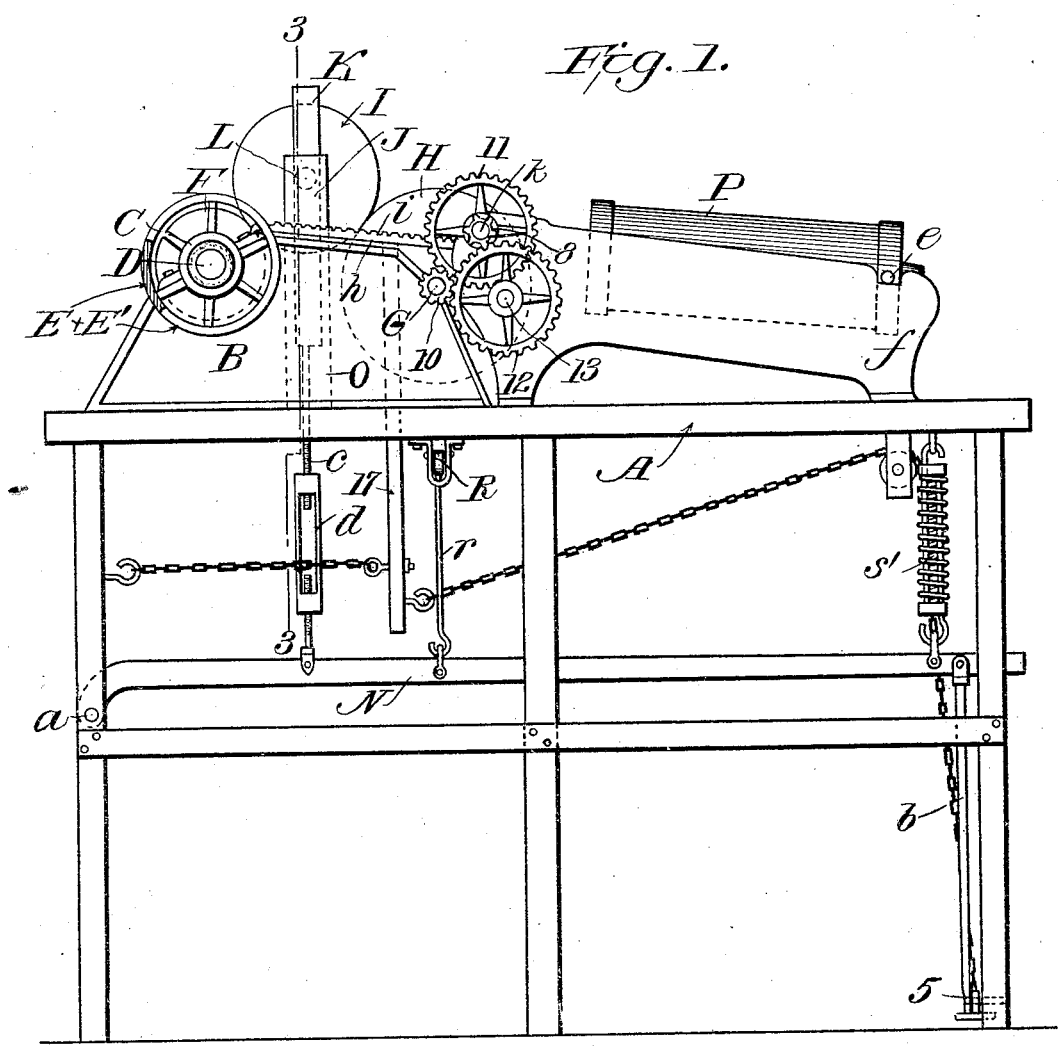
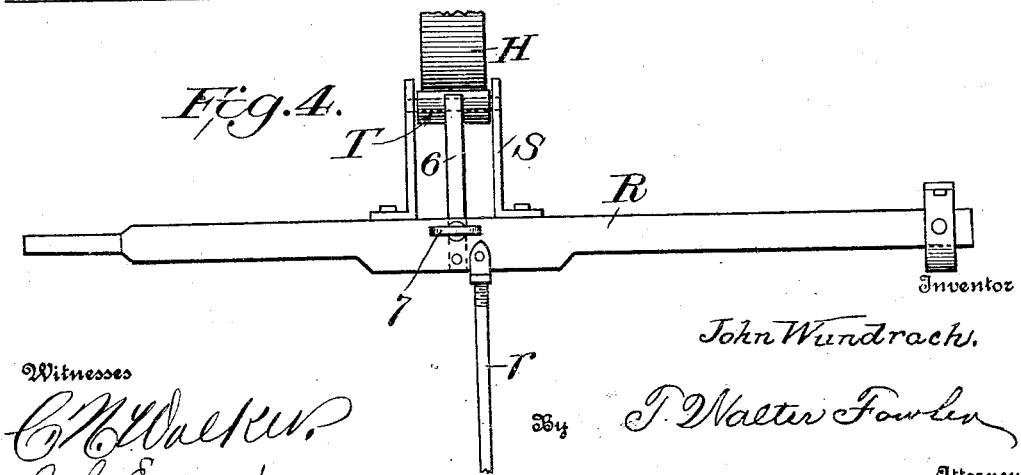
Witnesses
C. H. Walker
A. C. Ernst
Inventor
John Wundrach.
By T. Walter Fowler
Attorney J. WUNDRACH.
SAUSAGE MACHINE.
APPLICATION FILED AUG. 22, 1908.
931,363.
Patented Aug. 17, 1909.
2 SHEETS—SHEET 2.
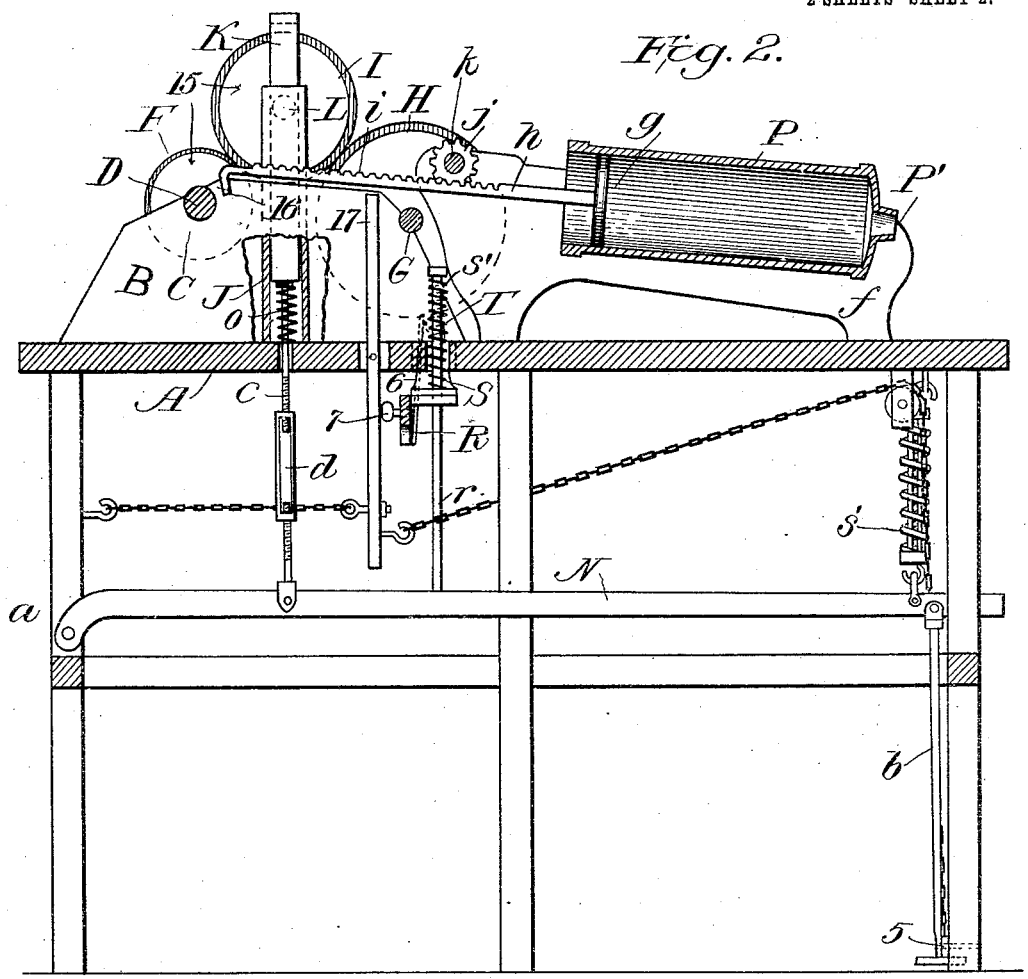
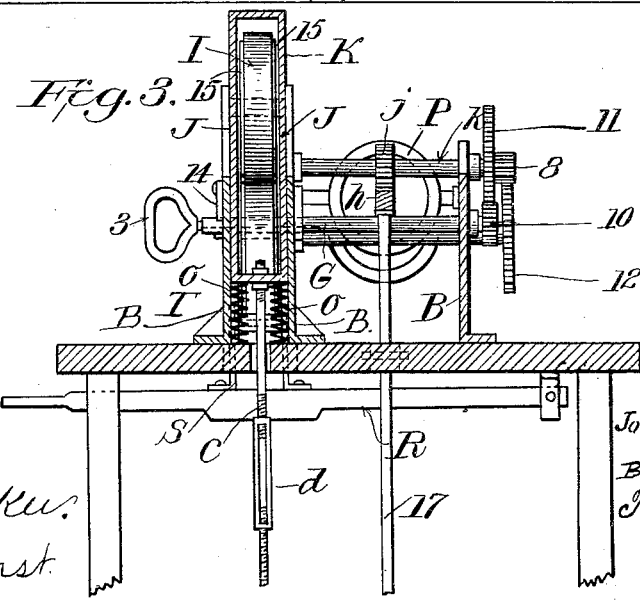
Witnesses
C. H. Walker.
A. C. Ernst.
Inventor
John Wundrach
By J. Walter Fowler
Attorney

UNITED STATES PATENT OFFICE.

JOHN WUNDRACH, OF CHICAGO, ILLINOIS, ASSIGNOR TO OMAHA PACKING COMPANY, OF CHICAGO, ILLINOIS, A CORPORATION OF ILLINOIS.

SAUSAGE-MACHINE.

No. 931,363.    Specification of Letters Patent.    Patented Aug. 17, 1909.

Application filed August 22, 1908. Serial No. 449,790.

*To all whom it may concern:*

Be it known that I, JOHN WUNDRACH, a citizen of the United States, residing at Chicago, in the county of Cook and State of Illinois, have invented certain new and useful Improvements in Sausage-Machines, of which the following is a specification.

My invention relates to certain new and useful improvements in a machine for filling cases with sausage-meat, and pertains more particularly to a friction drive mechanism and certain other features hereinafter described and claimed whereby the efficiency of the machine is greatly increased.

While the invention is intended primarily for use with power stuffing machines, the same may be applied to a hand stuffing machine with equal facility and with little or no modification of the salient features.

In the accompanying drawings forming part of this specification and in which similar reference characters indicate like parts in the several views:—Figure 1 is a side elevation of a power stuffing machine embodying my invention. Fig. 2 is a vertical cross-sectional view partly broken away. Fig. 3 is a cross sectional view on the line 3—3 of Fig. 1. Fig. 4 is a detail of the lever R and brake-roller T.

In carrying out my invention I provide a suitable table or support, A, upon which the mechanism is appropriately secured to operate as hereinafter indicated. To this table is bolted or otherwise secured the parallel vertically disposed sides B which constitute a rigid frame for the proper mounting of the operating mechanism, said sides, B, being formed or provided with journal boxes or bearings, C, for a horizontal shaft D, which extends transversely across one end of the machine. This shaft is, by preference, a power-shaft and is provided with fast-and-loose pulleys E, E', of the usual form and which are designed to be run by a belt not shown, driven from some source of power. On the shaft D between two of the sides B, is fixed a friction-drive wheel F, which is constantly driven by said shaft. The opposite end of the frame formed by the sides is also provided with journal-boxes or bearings for a horizontal transversely-extending shaft, G, on which between two of the aforesaid sides, B, is mounted a friction-wheel, H, which is adapted and designed to be driven by the shaft D and its friction-drive wheel, F, through the medium of an intermediate idler friction-pulley, I, which latter may be shifted vertically from one position to another, when desired to connect and disconnect the driven friction-wheel, H, with the driving friction wheel, F, before described. In order to effect this latter result, I construct two of the side frames with vertical guides or channels, J, in which are slidably-mounted the side members of a vertical frame K, said frame having suitable bearings for the journal ends of a horizontal transverse shaft, L, carrying the aforesaid idle friction-pulley, I, said pulley, I, being located intermediate of the driving and driven-pulleys and adapted to be manually lowered to bring its periphery into frictional engagement with the peripheries of the driving and driven-pulleys, and to thereby transmit motion to the latter, and to be automatically raised, when desired, to remove its periphery from frictional engagement with the driving and driven-pulleys and thereby disconnect the driven-pulley from the power.

The means for operating the frame which carries the power-transmitting pulley, are herein shown as consisting of a lever, N, under the table, A, having one end pivoted, at *a*, and having the opposite end attached in some suitable manner with a connection, *b*, which is operated, when desired, through the medium of a foot-lever, 5, within the control of the operator.

The return of the frame and its power-transmitting pulley from a depressed to an inoperative elevated position, may be effected by any well known elevating means, for instance by suitable springs, O, upon which the slidable frame is supported, said frame carrying a rod or connection, *c*, engaged by a yoke, *d*, which in turn is connected to the lever, N. The yoke may have the same function as the usual turn-buckle, for the purpose of regulating the tension of the springs and throw or length of movement of the slidable frame.

The meat cylinder, P, is located in advance of the driving devices heretofore mentioned and has trunnions, *e*, on its side near the front or delivery end and seating in bearings in a frame or support, *f*, whereby the cylinder may be tilted in a vertical plane in a manner and for a purpose well known in this art.

The front end of the cylinder has the usual tapered nozzle, P', over which the case is slipped; and the rear end of the cylinder is open to receive the charge of meat and to operatively admit the usual plunger or follower, *g*, which has the usual rearwardly-extending rod or stem, *h*, with a rack, *i*, adapted to be engaged by a pinion, *j*, on the shaft, *k*, whereby the forward feeding and reversing or withdrawal movements are imparted to the plunger.

In order to obtain a quick reverse movement of the plunger, I construct the shaft, G, of the driven pulley, H, for a transversely-sliding movement, which may be effected by the usual key and key-way connection between the shaft and pulley; to facilitate this action the shaft may be provided with a handle or hand-hold, 3, on one end, as shown in Fig. 3. The opposite end of this slidable shaft is provided with a pinion 10 which when the plunger is operating to compress the meat in the cylinder, is in mesh with a large gear-wheel 11 on the same shaft, *k*, which carries the pinion, *j*, which engages the rack, *i*, said shaft having also a pinion, 8, fixed to it and maintained in mesh with a large gear wheel, 12, on a counter-shaft, 13. When these gears are in the position shown in Fig. 3, the plunger is operated by a relatively slow movement through the pinion, 10, gear wheel 11 and rack and pinion; when the sliding shaft is moved transversely, the pinion, 10, thereon is brought into mesh with the large gear wheel, 12, on the shaft, 13, and through this gear and the pinion, 8, and the rack-and-pinion, the plunger is given a quick-return movement, which is desirable when the cylinder requires refilling.

The position of the slidable shaft may be maintained in either of its two positions by means of a latch, 14, or other well known appropriate means.

Beneath the table, A, of the machine and extending transversely and having one end pivotally connected to the stationary support, is a lever, R, having a bracket or bearing, S, for a small friction-roller, T, which is adapted to bear against the periphery of the driven friction-pulley, H, and to serve as a brake for checking the back-lash or rearward movement of said driven-wheel. A spring-plate, 6, whose tension may be adjustable by means of a set-screw, 7, is adapted to serve as an effective brake-shoe for the roller by pressing against the same with the requisite pressure.

It will be understood that the tendency of the driven friction-wheel is to run backward under the influence of the pressure of the plunger *g*, which is connected with said driven-wheel through the rack-and-pinion construction before described, during the interval after the operator has one casing filled and is placing another casing on the discharge nozzle of the meat cylinder, and backward movement of the driven-pulley would require several revolutions of the pulley in order to bring the plunger back to its former position. The object of the brake-roller is to prevent this rearward movement of the driven-pulley and to thereby hold the plunger in its proper relative position in the cylinder, during the release of the power from the driven-pulley, and the removal of one casing and the insertion of another. The brake-roller is brought into operation substantially coördinately with the elevation of the transmitting friction wheel, I, from its engagement with the driving and driven pulleys; and to this end, the lever which carries the brake-roller is connected by a rod, *r*, or other means with the lever, N, which controls the vertical movement of the power-transmitting friction-wheel.

When the operator releases the pressure upon the foot-lever 5, suitable springs, *s, s'*, act to return the lever, N, to normal position and to lift the brake-roller into contact with the driven friction-wheel, this action occurring coördinately with the elevation of the transmitting friction-wheel and the removal of power from the driven-wheel.

While the friction-wheels may be of any suitable construction, I prefer to make them of compressed fiber inclosed between two metallic side plates, 15, as shown. I also prefer to attach to the plunger rack, *i*, a safety device 16, which is designed to engage with a lever, 17, when the piston reaches the lower extremity of the meat cylinder, said bell-crank engaging with the foot-lever, 5, through the medium of a chain or other connection, and being arranged to prevent the plunger entering too far into the cylinder.

Having thus described my invention what I claim as new and desire to secure by Letters Patent is:—

1. In a sausage machine, the combination with the meat cylinder, the plunger and the rack and pinion, of a frame having parallel walls provided with vertical guides, a driving friction wheel mounted at one side of said guides, a driven friction-wheel mounted at the other side of said guides, a vertically-disposed frame having side members slidably mounted in said guides, a transmission friction-wheel carried by said vertical frame, yieldable elevating means operating on said vertical frame to normally remove its transmission wheel from engagement with said driving and driven wheels, and means for operating the vertical frame, said elevating means adapted to automatically return the vertical frame to normal position, upon this release of the frame-operating means.

2. In a sausage machine, the combination with the meat cylinder, the plunger, and the rack and operating pinion therefor, of a frame having vertical parallel guides in its sides, driving and driven friction wheels mounted at opposite sides of said guides, a frame mounted for vertical movement in said guides, a power transmitting friction wheel carried by said movable frame, means operating on said frame to normally elevate it and remove its friction wheel out of engagement with said driving and driven wheels, said elevating means adapted to yield under pressure to allow the transmitting friction wheel to be brought into engagement with the driving and driven wheels, and said elevating means returning the movable frame to normal position when the pressure thereon is released.

3. A sausage machine having in combination a meat cylinder, a plunger operable therein, a stationary frame having vertically channeled sides, a movable spring-pressed frame having vertical sides slidable between the channeled sides of the stationary frame, driving and driven friction wheels on the stationary frame and a transmission wheel on the spring-pressed frame, and means connecting with said spring-pressed frame and within the control of an operator for moving said frame against the pressure of its spring to thereby bring the transmitting friction wheel into operative contact with the driving and driven friction wheels, said spring adapted to return the frame to normal position when the pressure on the connecting means is released.

4. In a sausage machine, the combination with the meat cylinder, and the plunger and its actuating rack and pinion, of a stationary frame having vertical guides, a driving wheel, a driven wheel, connection between the driven wheel and said pinion, a vertically disposed spring-pressed frame mounted to slide in the guides of the stationary frame, a transmitting wheel mounted on the slidable frame adapted to engage and disengage the driving and driven wheels, means for moving the vertical frame against the pressure of its spring in one direction, to thereby move the transmission into operative contact with the driving and driven wheels, said spring adapted to return the frame to normal position and thereby cut off the power from the plunger, a brake member operating substantially coördinately with the release of the transmission wheel and adapted to engage the driven wheel to prevent back motion thereof, and means for regulating the power of the brake member and its resistance to the driven wheel.

5. In a sausage machine, the combination with the meat cylinder, and the plunger and its actuating rack and pinion, of a drive wheel, a driven wheel, connections between the driven wheel and said pinion, a shiftable power transmitting wheel intermediate of the driving and driven wheels for communicating the power of the former to the latter, means for holding the intermediate transmitting wheel in operating connection with the driving and driven wheels, and means for moving the intermediate wheel vertically out of operating connection with the driving and driven wheels when released whereby the power is cut off from the plunger, a brake roller operating substantially coördinately with the release of the intermediate wheel and adapted to engage the driven wheel to prevent back motion thereof, a spring-plate engaging said roller, and means for adjusting the pressure of the plate on the roller.

6. In a sausage machine, the combination with the meat cylinder and the plunger and its actuating rack and pinion, of a drive wheel, a driven wheel, connections between the driven wheel and said pinion, a shiftable power transmitting wheel intermediate of the driving and driven wheels for communicating the power of the former to the latter, means for holding the intermediate wheel in operating connection with the driving and driven wheels, said last means comprising a pivoted lever, connections between the same and the shiftable wheel, said connections including a vertically slidable frame in which the shiftable wheel is mounted and means connecting said slidable frame with the pivoted lever, a foot-lever and connections between the same and the first-named lever, and a spring for moving the shiftable wheel vertically out of operating connection with the driving and driven wheels when the foot lever is released, whereby the power is cut off from the plunger.

7. In a sausage machine, the combination with the meat cylinder, and the plunger and its actuating rack and pinion, of a drive wheel, a driven wheel, connections between the driven wheel and said pinion, a power transmitting wheel intermediate of the driving and driven wheels, a frame in which said transmitting wheel is mounted, vertical guides in which said frame is slidable, a spring upon which said frame is supported, said springs tending to normally raise the transmitting wheel out of operating connection with the driving and driven wheels, and a foot-lever and connections for moving the transmitting wheel into engagement with the driving and driven wheels.

8. In a sausage machine, the combination with the meat cylinder, and the plunger and its actuating mechanism, of driving and driven wheels and an intermediate wheel, means for moving the intermediate wheel into and out of operating connection with the other wheels, and means for effecting a quick reverse movement of the plunger, said means including a transversely slidable shaft on which the driven wheel is mounted, a train of gears of different sizes, and a gear on the slidable shaft and shiftable therewith and adapted to engage different gears of said train.

In testimony whereof I affix my signature in presence of two witnesses.

JOHN WUNDRACH.

Witnesses:
　ALBIN J. PIERZYNSKI,
　WM. KINNAIRD.